US012810591B2

(12) United States Patent
More et al.

(10) Patent No.: US 12,810,591 B2
(45) Date of Patent: Nov. 24, 2026

(54) LEARNING DEVICE, LEARNING METHOD, AND STORAGE MEDIUM

(71) Applicant: HONDA MOTOR CO., LTD., Tokyo (JP)

(72) Inventors: Amit Popat More, Wako (JP); Srinivasa Divakar Bhat, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 18/429,504

(22) Filed: Feb. 1, 2024

(65) Prior Publication Data

US 2024/0265678 A1 Aug. 8, 2024

(30) Foreign Application Priority Data

Feb. 7, 2023 (JP) ................................ 2023-016805

(51) Int. Cl.
*G06V 10/764* (2022.01)
*G06V 10/774* (2022.01)
(Continued)

(52) U.S. Cl.
CPC .......... *G06V 10/774* (2022.01); *G06V 10/764* (2022.01); *G06V 10/778* (2022.01); *G06V 10/82* (2022.01)

(58) Field of Classification Search
CPC .... G06V 10/774; G06V 10/778; G06V 10/82; G06V 10/764; G06V 20/41
See application file for complete search history.

(56) References Cited

U.S. PATENT DOCUMENTS 6,480,621 B1 * 11/2002 Lyon .................... G06N 3/0499 382/161
11,113,599 B2 * 9/2021 Wang ..................... G06N 3/094
(Continued)

FOREIGN PATENT DOCUMENTS

JP 2019-149148 9/2019

OTHER PUBLICATIONS

Saha et al ; "Similarity based label smoothing for dialogue generation"; Proceedings of the 19th International Conference on Natural Language Processing (ICON). (Year: 2022).*
(Continued)

*Primary Examiner* — Shaghayegh Azima
(74) *Attorney, Agent, or Firm* — Amin, Turocy & Watson, LLP

(57) ABSTRACT

A learning device includes a storage medium configured to store computer-readable instructions and a processor connected to the storage medium. The processor trains a machine learning model that receives an input of an image including a plurality of pixels and outputs a degree of accuracy with which each pixel corresponds to a class indicating a type of an object by executing the computer-readable instructions. The processor adjusts an output value of the degree of accuracy using a predetermined parameter with a tendency to decrease the output value of the degree of accuracy corresponding to a correct-answer class and to increase the output value of the degree of accuracy corresponding to a class other than the correct-answer class and trains the machine learning model on the basis of the adjusted output value.

8 Claims, 4 Drawing Sheets

(51) Int. Cl.
*G06V 10/778* (2022.01)
*G06V 10/82* (2022.01)

(56) References Cited

U.S. PATENT DOCUMENTS

| | | | | |
|---|---|---|---|---|
| 11,887,003 | B1 * | 1/2024 | Bopardikar | G06N 20/00 |
| 12,406,210 | B2 * | 9/2025 | Arpit | G06N 20/20 |
| 2017/0132512 | A1 * | 5/2017 | Ioffe | G06N 3/09 |
| 2018/0137433 | A1 * | 5/2018 | Devarakonda | G06N 5/022 |
| 2018/0373963 | A1 * | 12/2018 | Lo | G06N 3/084 |
| 2019/0243928 | A1 * | 8/2019 | Rejeb Sfar | G06V 30/422 |
| 2021/0397610 | A1 * | 12/2021 | Singh | G06F 16/2425 |
| 2022/0012815 | A1 * | 1/2022 | Kearney | G06N 3/0475 |
| 2022/0180447 | A1 * | 6/2022 | Kearney | G06N 3/045 |
| 2023/0017505 | A1 | 1/2023 | Menon et al. | |

OTHER PUBLICATIONS

Tan, et al. "Equalization loss v2: A new gradient balance approach for longtailed object detection", Proceedings of the IEEE/CVF conference on computer vision and pattern recognition. 2021.
Tan, et al. "Equalization loss for long-tailed object recognition", Proceedings of the IEEE/CVF conference on computer vision and pattern recognition. 2020.
Japanese Office Action for Japanese Patent Application No. 2023-016805 mailed Sep. 1, 2026.
Chinese Office Action for Chinese Patent Aplication No. 202410172865.4 mailed Sep. 24, 2026.
Zeju Li et al., "Overfitting of neural nets under class imbalance: Analysis and improvements for segmentation", arxiv, 1-9, Oct. 1, 2019.
Kaidi Cao et al., "Learning Imbalanced Datasets with Label-Distribution-Aware Margin Loss", arxiv, 1-18, Oct. 27, 2019.

* cited by examiner

LEARNING DEVICE, LEARNING METHOD, AND STORAGE MEDIUM

CROSS-REFERENCE TO RELATED APPLICATION

Priority is claimed on Japanese Patent Application No. 2023-016805, filed Feb. 7, 2023, the content of which is incorporated herein by reference.

BACKGROUND

Field of the Invention

The present invention relates to a learning device, a learning method, and a storage medium.

Description of Related Art

In the related art, a method of training a machine learning model that receives an input of an image and classifies a type of an object included in the image is known. For example, in Tan, Jingru, et al. "Equalization loss v2: A new gradient balance approach for long-tailed object detection," Proceedings of the IEEE/CVF conference on computer vision and pattern recognition, 2021, a technique of improving detection of a long-tailed object by scaling a gradient of logits corresponding to a correct-answer class of training data and a gradient of logits corresponding to a non-correct-answer class using a parameter is described. In Tan, Jingru, et al. "Equalization loss for long-tailed object recognition," Proceedings of the IEEE/CVF conference on computer vision and pattern recognition, 2020, a technique of improving recognition accuracy of a class with a small number of samples by selecting a gradient of logits corresponding to a class with a small number of samples of training data and ignoring a gradient of logits corresponding to a class with a large number of samples of training data is described.

However, in the technique described in Non-Patent Document 1, monitoring of information on a gradient (for example, a magnitude of the gradient) during learning is required, and processes may be troublesome. In the technique described in Non-Patent Document 2, since a gradient of specific logits is ignored, recognition accuracy of the class in which the gradient of logits has been ignored may deteriorate.

SUMMARY

The present invention was made in consideration of the aforementioned circumstances, and an objective thereof is to provide a learning device, a learning method, and a storage medium that can simply and accurately train a machine learning model for classifying a type of an object included in an image.

A learning device, a learning method, and a storage medium according to the present invention employ the following configurations.

(1) According to an aspect of the present invention, there is provided a learning device including: a storage medium configured to store computer-readable instructions; and a processor connected to the storage medium, wherein the processor trains a machine learning model that receives an input of an image including a plurality of pixels and outputs a degree of accuracy with which each pixel corresponds to a class indicating a type of an object by executing the computer-readable instructions, and the processor adjusts an output value of the degree of accuracy using a predetermined parameter with a tendency to decrease the output value of the degree of accuracy corresponding to a correct-answer class and to increase the output value of the degree of accuracy corresponding to a class other than the correct-answer class and trains the machine learning model on the basis of the adjusted output value.

(2) In the aspect of (1), the processor adjusts the output value by subtracting the predetermined parameter which is a positive constant from the output value of the degree of accuracy corresponding to the correct-answer class and adding the predetermined parameter to the output value of the degree of accuracy corresponding to a class other than the correct-answer class.

(3) In the aspect of (1), the processor sets a positive constant which differs depending on a type of the correct-answer class as the predetermined parameter when each of a plurality of classes is the correct-answer class, and the processor adjusts the output value by subtracting the predetermined parameter from the output value of the degree of accuracy corresponding to the correct-answer class and adding the predetermined parameter to the output value of the degree of accuracy corresponding to a class other than the correct-answer class.

(4) In the aspect of (1), the processor sets a positive constant which differs depending on a type of the correct-answer class and a class other than the correct-answer class as the predetermined parameter when each of a plurality of classes is the correct-answer class, and the processor adjusts the output value by subtracting the predetermined parameter from the output value of the degree of accuracy corresponding to the correct-answer class and adding the predetermined parameter to the output value of the degree of accuracy corresponding to a class other than the correct-answer class.

(5) In the aspect of (1), the processor sets the same predetermined parameter for two or more classes between which a semantic similarity is determined to be equal to or greater than a threshold value out of a plurality of classes.

(6) In the aspect of (1), the processor sets the same predetermined parameter for two or more classes between which a difference in the number of pieces of training data used as the correct-answer class for learning is determined to be equal to or less than a threshold value out of a plurality of classes.

(7) In the aspect of (1), the processor sets the same predetermined parameter for two or more classes between which a difference in a performance index of the degree of accuracy output from the machine learning model is determined to be equal to or less than a threshold value out of a plurality of classes.

(8) According to another aspect of the present invention, there is provided a learning method of training a machine learning model that receives an input of an image including a plurality of pixels and outputs a degree of accuracy with which each pixel corresponds to a class indicating a type of an object, the learning method being performed by a computer, the learning method including: adjusting an output value of the degree of accuracy using a predetermined parameter with a tendency to decrease the output value of the degree of accuracy corresponding to a correct-answer class and to increase the output value of the degree of accuracy corresponding to a class other than the correct-answer class; and training the machine learning model on the basis of the adjusted output value.

(9) According to another aspect of the present invention, there is provided a non-transitory computer-readable storage medium storing a program, the program causing a computer to train a machine learning model that receives an input of an image including a plurality of pixels and outputs a degree of accuracy with which each pixel corresponds to a class indicating a type of an object, the program causing the computer to perform: adjusting an output value of the degree of accuracy using a predetermined parameter with a tendency to decrease the output value of the degree of accuracy corresponding to a correct-answer class and to increase the output value of the degree of accuracy corresponding to a class other than the correct-answer class; and training the machine learning model on the basis of the adjusted output value.

According to the aspects of (1) to (9), it is possible to simply and accurately train a machine learning model for classifying a type of an object included in an image.

DESCRIPTION OF EMBODIMENTS

Hereinafter, a learning device, a learning method, and a storage medium according to an embodiment of the present invention will be described with reference to the accompanying drawings.

[Configuration]

Figure 1:
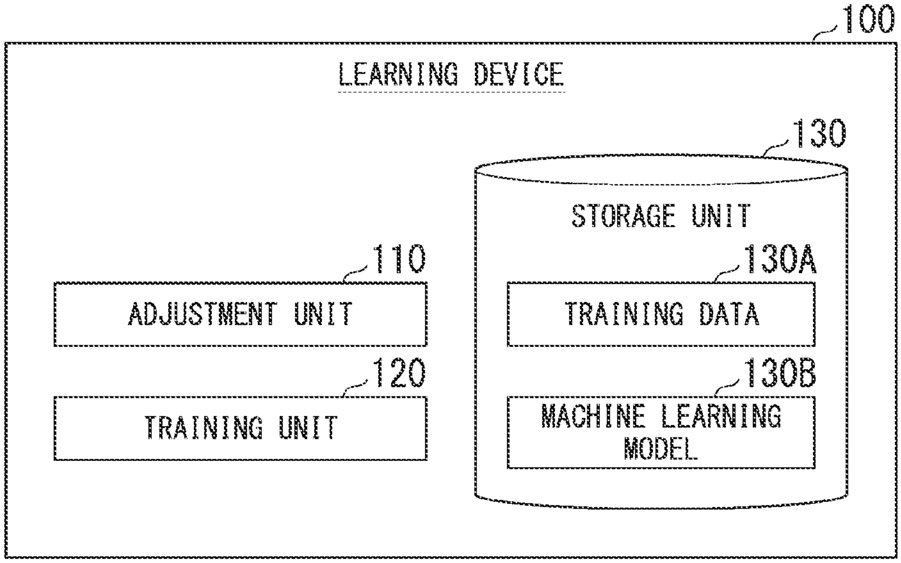
FIG. 1 is a diagram illustrating a configuration of a learning device according to an embodiment.

FIG. 1 is a diagram illustrating a configuration of a learning device 100 according to an embodiment. The learning device 100 is an information processing device for training a machine learning model that receives an input of an image including a plurality of pixels and outputs a degree of accuracy with which each pixel corresponds to a class indicating a type of an object. The learning device 100 includes, for example, an adjustment unit 110, a training unit 120, and a storage unit 130. The adjustment unit 110 and the training unit 120 are realized, for example, by causing a hardware processor such as a central processing unit (CPU) to execute a program (software). Some or all of the constituents may be realized by hardware (a circuit unit including circuitry) such as a large scale integration (LSI) device, an application-specific integrated circuit (ASIC), a field-programmable gate array (FPGA), or a graphics processing unit (GPU) or may be cooperatively realized by software and hardware. The program may be stored in a storage device (a storage device including a non-transitory storage medium) such as an HDD or a flash memory of the learning device 100 in advance or may be stored in a detachable storage medium such as a DVD or a CD-ROM and installed in the HDD or the flash memory of the learning device 100 by setting the storage medium (non-transitory storage medium) into a drive device. The storage unit 130 stores, for example, training data 130A and a machine learning model 130B. The storage unit 130 is realized, for example, by a RAM, a flash memory, or an SD card.

Figure 2:
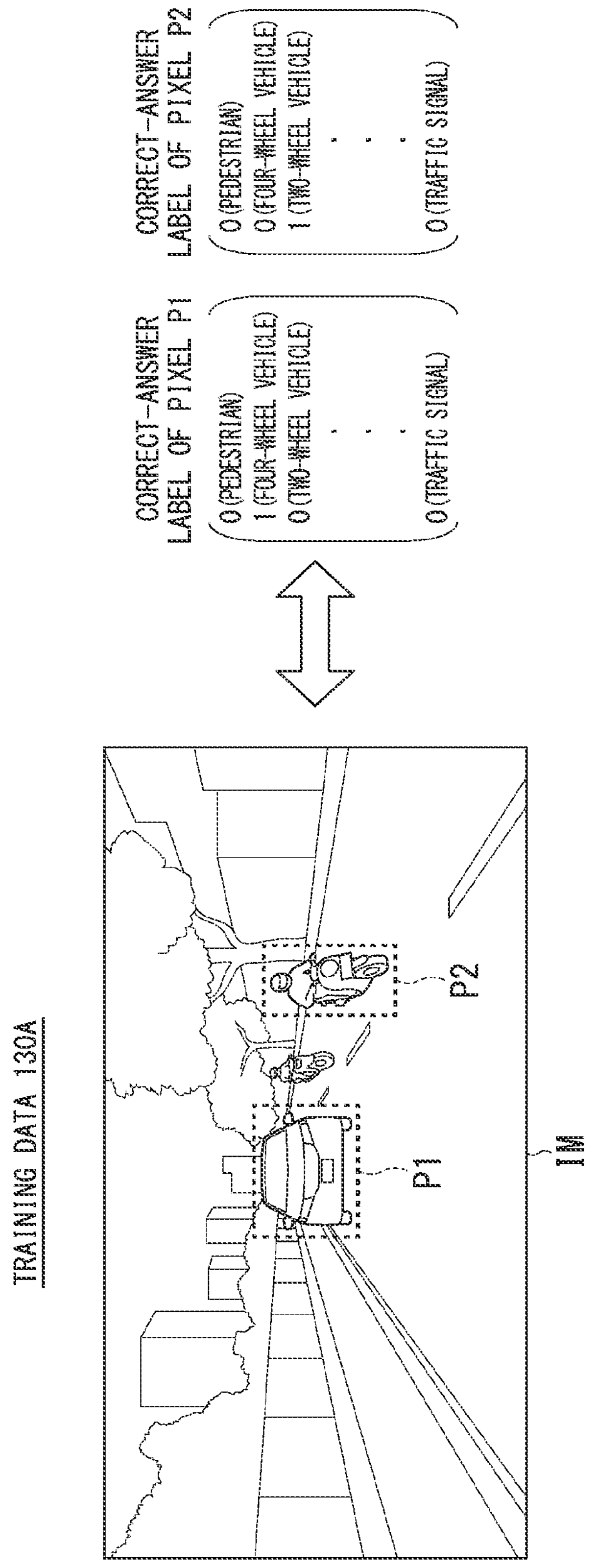
FIG. 2 is a diagram illustrating an example of a configuration of training data.

FIG. 2 is a diagram illustrating an example of a configuration of the training data 130A. The training data 130A is, for example, data in which a class indicating a type of an object indicated by a pixel is correlated as a correct-answer class with the pixel (a pixel group) of one or more images IM. For example, in FIG. 2, the image IM includes a pixel P1 indicating a four-wheel vehicle and a pixel P2 indicating a two-wheel vehicle. Here, the pixel P1 is correlated with, for example, a vector in which only a component of a class indicating a four-wheel vehicle is set to 1 and components of the other classes are set to 0, and thus training data 130A including a four-wheel vehicle class as a correct-answer class is acquired. For example, the pixel P2 is correlated with a vector in which only a component of a class indicating a two-wheel vehicle is set to 1 and components of the other classes are set to 0, and thus training data 130A including a two-wheel vehicle class as a correct-answer class is acquired. The storage unit 130 stores correspondence between the pixels and the correct-answer classes as the training data 130A.

The training data 130A is generated, for example, by a manager or an operator of the learning device 100 designating each pixel in an image IM and a correct-answer class using a terminal in advance and stored in the storage unit 130. Alternatively, the learning device 100 may download the training data 130A stored in an external server to the storage unit 130 via a network at an execution timing of learning in the training unit 120.

The machine learning model 130B is a machine learning model that receives an input of a pixel of an image IM and outputs a degree of accuracy (a logit) with which the pixel corresponds to a class of a type of an object. Here, the degree of accuracy is a probability that a pixel of an image IM corresponds to a class indicating a type of an object and may be more generally a value correlated with a probability that a pixel of an image IM corresponds to a class indicating a type of an object. The machine learning model 130B is, for example, a convolutional neural network (CNN) and outputs a degree of accuracy with which an input pixel corresponds to a class by extracting a feature quantity of the pixel.

[Outline of Machine Learning]

Figure 3:
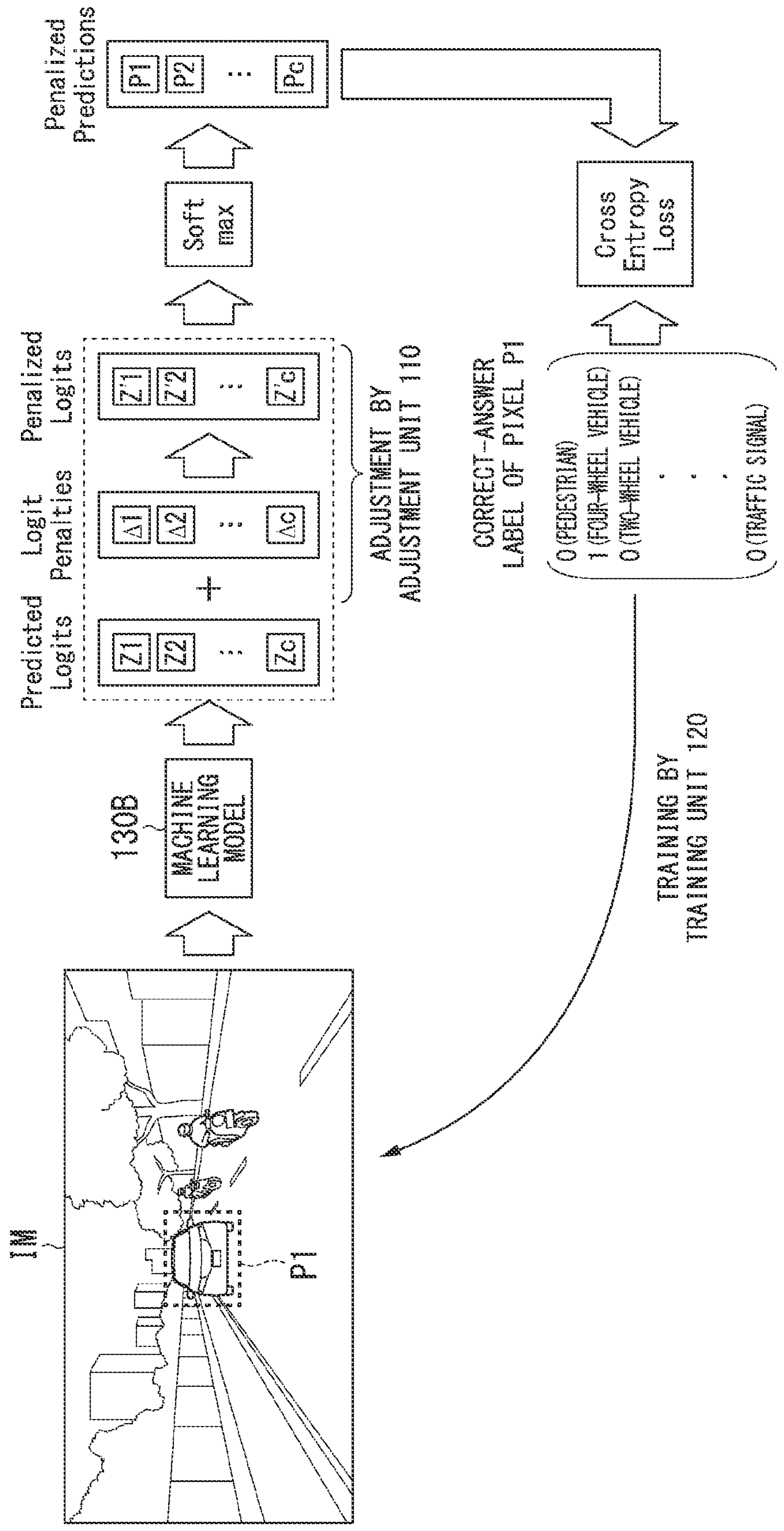
FIG. 3 is a diagram schematically illustrating machine learning that is performed by an adjustment unit and a training unit.

FIG. 3 is a diagram schematically illustrating machine learning that is performed by the adjustment unit 110 and the training unit 120. In FIG. 3, C indicates a total number of classes to be classified, and $Z_1$ to $Z_C$ indicate logits output from the machine learning model 130B. In the related art, output logits are converted to probability values normalized in a value of 0 to 1 by substituting the logits to a Softmax function, an error between the converted probability values and a correct-answer vector is calculated using an error function such as a cross entropy error L, and a machine learning model is trained, for example, using a method such as an error back propagation method such that the calculated error is minimized. In this case, with progression of training, logits output from the machine learning model saturates both a correct-answer class and a non-correct-answer class, and the magnitude of a gradient tends to decrease (a gradient loss problem). As a result, a learning speed of the machine learning model may be lowered and learning of the machine learning model may fail in some cases.

In consideration of the aforementioned circumstances, as illustrated in FIG. 3, the adjustment unit 110 calculates penalized updated logits $Z'_1$ to $Z'_C$ by adding penalties $\Delta_1$ to $\Delta_C$ to the logits $Z_1$ to $Z_C$ output from the machine learning model 130B. Then, the training unit 120 calculates penalized probability values $P'_1$ to $P'_C$ by substituting the calculated updated logits $Z'_1$ to $Z'_C$ to a Softmax function and trains the machine learning model 130B, for example, using a method such as an error back propagation method such that a cross entropy error L between the calculated probability values $P'_1$ to $P'_C$ and a correct-answer vector is minimized. In this way, by performing training with the penalties $\Delta_1$ to $\Delta_C$ added to the logits $Z_1$ to $Z_C$, an absolute value of the gradient is increased in comparison with a case in which penalties are not added as will be described below, and thus it is possible to solve the gradient loss problem. A penalty is an example of a "predetermined parameter."

In this embodiment, since multi-value classification of a pixel included in an image is described as an example and thus the Softmax function is applied in FIG. 3. However, the present invention is not limited to such a configuration, and a sigmoid function may be applied instead of the Softmax function in FIG. 3 when two-value classification of a pixel included in an image is performed. In this case, as the cross entropy error L, a binary cross entropy error L may be calculated instead of the Softmax cross entropy error L. For example, FOCAL Loss (FL) may be applied as an error function instead of the cross entropy error L.

[Setting of Penalty]

A method of setting penalties $\Delta_1$ to $\Delta_C$ which is performed by the adjustment unit 110 will be described in detail below. The adjustment unit 110 may set, for example, a single positive constant $\Delta$ as the penalties $\Delta_1$ to $\Delta_C$. In this case, the adjustment unit 110 calculates updated logits $Z'_i$ and $Z'_j$ by subtracting the penalty $\Delta$ from a logit $Z_i$ for a correct-answer class i and adding the penalty $\Delta$ to a logit $Z_j$ for a class j other than the correct-answer class as expressed in Expression (1).

$$Z'_i = Z_i - \Delta \tag{1}$$

$$Z'_j = Z_j + \Delta,\ \forall\, j \neq i$$

Then, the training unit 120 acquires probability values $P'_i$ and $P'_j$ expressed by Expression (2) by substituting the calculated updated logits $Z'_i$ and $Z'_j$ to the Softmax function.

$$P'_i = \frac{e^{Z_i - \Delta}}{\sum e^{Z_j + \Delta}} \tag{2}$$

$$P'_j = \frac{e^{Z_i + \Delta}}{e^{Z_i - \Delta} + \sum_{\forall k \neq i} e^{Z_k + \Delta}},\ \forall\, j \neq i$$

Then, the training unit 120 calculates the cross entropy error L between the calculated probability values $P'_i$ and $P'_j$ and the correct-answer vector. At this time, gradients $G'_i$ and $G'_j$ of the calculated cross entropy error L are expressed by Expression (3).

$$\mathcal{G}'_i = \frac{d\mathcal{L}}{dZ_i} = P'_i - 1 \tag{3}$$

$$\mathcal{G}'_j = \frac{d\mathcal{L}}{dZ_j} = P'_j,\ \forall\, j \neq i$$

Here, since the penalty $\Delta$ is a positive constant, $Z'_i<Z_i$ and $Z'_j>Z_j$ are satisfied, and an inequality expressed by Expression (4) is satisfied.

$$Z'_i < Z_i \Rightarrow P'_i < P_i \tag{4}$$

$$\Rightarrow \|\mathcal{G}'_i\| > \|\mathcal{G}_i\|$$

$$Z'_j > Z_j \Rightarrow P'_j > P_j$$

$$\Rightarrow \|\mathcal{G}'_j\| > \|\mathcal{G}_j\|$$

In Expression (4), the probability values $P'_i$ and $P'_j$ and the gradients $G'_i$ and $G'_j$ are probability values and gradients obtained by substituting the logits $Z_1$ and $Z_C$ into the Softmax function without adding a penalty thereto. When the penalty $\Delta$ is a positive constant, as expressed in Expression (4), absolute values of the gradients $G'_i$ and $G'_j$ when the penalty is added are greater than those of the gradients $G_i$ and $G_j$ when the penalty is not added. That is, with this configuration, it is possible to solve the gradient loss problem in which the magnitude of a gradient decreases because the logits output from the machine learning model saturate both the correct-answer class and the non-correct-answer class during training.

In the above description, the adjustment unit 110 sets the penalties $\Delta_1$ to $\Delta_C$ to a single positive constant $\Delta$, but the present invention is not limited to such a configuration. For example, when each of a plurality of logits $Z_1$ to $Z_C$ is a logit $Z_i$ of a correct-answer class, the adjustment unit 110 may set a positive constant $\Delta_i$ differing depending upon a type of the correct-answer class. That is, the adjustment unit 110 may set the penalty $\Delta_i$ without changing C. In this case, similarly, the adjustment unit 110 calculates the updated logits $Z'_i$ and $Z'_j$ by subtracting the penalty $\Delta_i$ from the logits $Z_i$ of the correct-answer class and adding the penalty $\Delta_i$ to the logits $Z_j$ of a class other than the correct-answer class. With this configuration, it is also possible to solve the gradient loss problem.

For example, when each of a plurality of logits $Z_1$ to $Z_C$ is a logit $Z_i$ of a correct-answer class, the adjustment unit 110 may set a positive constant $\Delta_{ij}$ differing depending on a type of the correct-answer class and a class other than the correct-answer class. That is, the adjustment unit 110 may set the penalty $\Delta_{ij}$ without changing C×C. In this case, similarly, the adjustment unit 110 calculates the updated logits $Z'_i$ and $Z'_j$ by subtracting the penalty $\Delta_{ij}$ from the logits $Z_i$ of the correct-answer class and adding the penalty $\Delta_{ij}$ to the logits $Z_j$ of a class other than the correct-answer class. With this configuration, it is also possible to solve the gradient loss problem.

[Decrease of Number of Penalties]

The adjustment unit 110 may cause a penalty $\Delta$ to be shared by the classes along with applying the penalty $\Delta$ to the logits of the classes such that the gradients are not saturated. Accordingly, it is possible to decrease a training load while solving the gradient loss problem. For example, the adjustment unit 110 may set the same penalty $\Delta$ for two or more classes having high semantic similarity out of a plurality of classes 1 to C. For example, the adjustment unit 110 may convert names of a plurality of classes 1 to C to distributed representations, calculate semantic similarity between the distributed representations using cosine similarity, and set the same penalty $\Delta$ for two or more classes between which the calculated cosine similarity is equal to or greater than a threshold value.

For example, the adjustment unit 110 may set the same penalty $\Delta$ for two or more classes in which the numbers of pieces of training data 130A corresponding to a correct-answer class are the same out of a plurality of classes 1 to C. For example, the adjustment unit 110 may set the same penalty Δ for two or more classes between which a difference in the number of pieces of training data 130A corresponding to a correct-answer class is equal to or less than a threshold value out of a plurality of classes 1 to C.

For example, the adjustment unit 110 may set the same penalty Δ for two or more classes in which performance indices of logits output from the machine learning model 130B are similar out of a plurality of classes 1 to C. For example, the adjustment unit 110 may set the same penalty Δ for two or more classes between which a difference in the performance index (for example, a correct answer rate, a precision factor, or reproducibility) of logits output from the machine learning model 130B is equal to or less than a threshold value out of a plurality of classes 1 to C.

As another method of decreasing the number of penalties, the adjustment unit 110 may limit logits to which the penalty Δ is to be applied on the basis of a predetermined condition. An example of the predetermined condition, the adjustment unit 110 may promote training by applying the penalty Δ to the logits $Z_i$ and $Z_j$ only for a correct-answer class i which is erroneously classified, that is, only when a probability value $P_i$ of a logit $Z_i$ of a correct-answer class i is less than a probability value $P_j$ of a logit $Z_j$ of a non-correct-answer class j. Here, "when it is less than the probability value $P_j$" may be a "case in which it is less than a probability value $P_j$ at least one" out of a plurality of non-correct-answer classes or may be a "case in which it is less than all the probability values $P_j$."

As another example of the predetermined condition, the adjustment unit 110 may apply the penalty Δ only to logits $Z_i$ and $Z_j$ corresponding to the probability values $P_i$ and $P_j$ satisfying $\alpha<P_i<\beta$ and $\gamma<P_j<\varepsilon$, where α, β, γ, and $\varepsilon\in(0, 1)$ ($\alpha<\beta$, $\gamma<\varepsilon$) are constants. That is, the adjustment unit 110 may promote training by preferentially increasing the absolute value of the gradient by applying the penalty Δ to only the logits $Z_i$ and $Z_j$ of which the probability values $P_i$ and $P_j$ do not converge on 1 and 0 (in other words, logits of which learning are not sufficiently performed).

[Process Flow]

Figure 4:
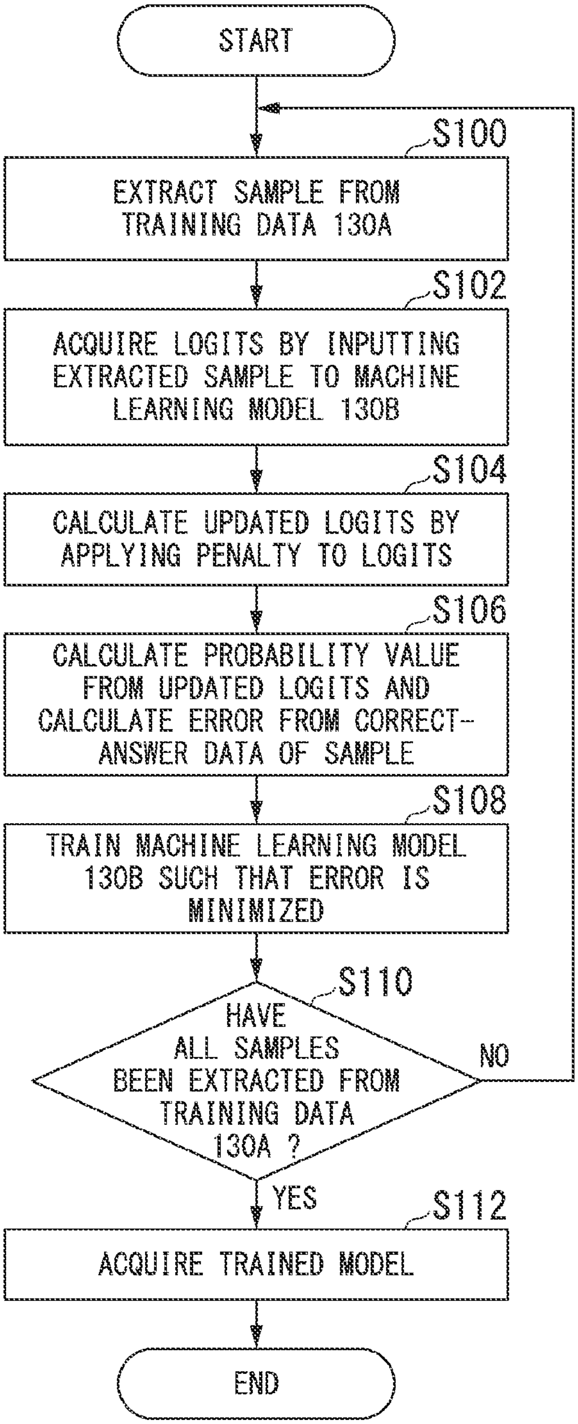
FIG. 4 is a flowchart illustrating an example of a process flow that is performed by the learning device according to the embodiment.

A process flow which is performed by the learning device 100 according to the embodiment will be described below with reference to FIG. 4. FIG. 4 is a flowchart illustrating an example of a process flow which is performed by the learning device 100 according to the embodiment.

First, the training unit 120 extracts a sample from the training data 130A (Step S100). Then, the training unit 120 acquires logits by inputting the extracted sample to the machine learning model 130B (Step S102). Then, the adjustment unit 110 calculates updated logits by applying a penalty to the logits (Step S104).

Then, the training unit 120 calculates probability values from the updated logits and calculates an error between the sample and correct-answer data (Step S106). Then, the training unit 120 trains the machine learning model 130B such that the calculated error is minimized (Step S108). Then, the training unit 120 determines whether all the samples have been extracted from the training data 130A (Step S110). When it is determined that all the samples have not been extracted, the training unit 120 returns the process flow to Step S100. On the other hand, when it is determined that all the samples have been extracted, the training unit 120 acquires the machine learning model 130B at the time point of determination as a trained model. Accordingly, the process flow of the flowchart ends.

In the flowchart, the training unit 120 extracts a sample from the training data 130A. In this case, an image IM which is the sample is not limited to an original image itself, but may include an image obtained by performing predetermined data extension (for example, rotation, parallel movement, enlargement, reduction, shearing, inversion, or adjustment of brightness of an image IM) on the original image. In this case, it is possible to more accurately train the machine learning model 130B by increasing the number of learning times on the basis of the same image IM.

According to the aforementioned embodiment, an output value of a machine learning model is adjusted using a predetermined parameter with a tendency to decrease the output value of the machine learning model corresponding to a correct-answer class and to increase the output value of the machine learning model corresponding to a class other than the correct-answer class, and the machine learning model is trained on the basis of the adjusted output value. Accordingly, it is possible to simply and accurately train the machine learning model for classifying a type of an object included in an image.

The aforementioned embodiment can be expressed as follows.

A learning device including:

a storage medium configured to store computer-readable instructions; and a processor connected to the storage medium, wherein the processor executes the computer-readable instructions to train a machine learning model that receives an input of an image including a plurality of pixels and outputs a degree of accuracy with which each pixel corresponds to a class indicating a type of an object, wherein the processor performs:

adjusting an output value of the degree of accuracy using a predetermined parameter with a tendency to decrease the output value of the degree of accuracy corresponding to a correct-answer class and to increase the output value of the degree of accuracy corresponding to a class other than the correct-answer class; and training the machine learning model on the basis of the adjusted output value.

While a mode for carrying out the present invention has been described above in conjunction with an embodiment, the present invention is not limited to the embodiment, and various modifications and replacements can be added thereto without departing from the gist of the invention.

What is claimed is:

1. A learning device comprising:

a storage medium configured to store computer-readable instructions; and a processor connected to the storage medium, wherein the processor trains a machine learning model on the basis of training data including correspondence between pixels of one or more images and correct-answer classes, the machine learning model being a convolutional neural network, receiving an input of an image including a plurality of pixels and outputting a degree of accuracy with which each pixel corresponds to a class indicating a type of an object by executing the computer-readable instructions, wherein the processor adjusts an output value of the degree of accuracy using a predetermined parameter with a tendency to decrease the output value of the degree of accuracy corresponding to a correct-answer class and to increase the output value of the degree of accuracy corresponding to a class other than the correct-answer class, wherein the processor trains the machine learning model on the basis of the adjusted output value and wherein the processor sets the same predetermined parameter for two or more classes between which a difference in the number of pieces of training data used as the correct-answer class for learning is determined to be equal to or less than a threshold value out of a plurality of classes.

2. The learning device according to claim 1, wherein the processor adjusts the output value by subtracting the predetermined parameter which is a positive constant from the output value of the degree of accuracy corresponding to the correct-answer class and adding the predetermined parameter to the output value of the degree of accuracy corresponding to a class other than the correct-answer class.

3. The learning device according to claim 1, wherein the processor sets a positive constant which differs depending on a type of the correct-answer class as the predetermined parameter when each of a plurality of classes is the correct-answer class, and wherein the processor adjusts the output value by subtracting the predetermined parameter from the output value of the degree of accuracy corresponding to the correct-answer class and adding the predetermined parameter to the output value of the degree of accuracy corresponding to a class other than the correct-answer class.

4. The learning device according to claim 1, wherein the processor sets a positive constant which differs depending on a type of the correct-answer class and a class other than the correct-answer class as the predetermined parameter when each of a plurality of classes is the correct-answer class, and wherein the processor adjusts the output value by subtracting the predetermined parameter from the output value of the degree of accuracy corresponding to the correct-answer class and adding the predetermined parameter to the output value of the degree of accuracy corresponding to a class other than the correct-answer class.

5. The learning device according to claim 1, wherein the processor sets the same predetermined parameter for two or more classes between which a semantic similarity is determined to be equal to or greater than a threshold value out of a plurality of classes.

6. A non-transitory storage medium configured to store computer-readable instructions; and a processor connected to the storage medium, wherein the processor trains a machine learning model on the basis of training data including correspondence between pixels of one or more images and correct-answer classes, the machine learning model being a convolutional neural network, receiving an input of an image including a plurality of pixels and outputting a degree of accuracy with which each pixel corresponds to a class indicating a type of an object by executing the computer-readable instructions, wherein the processor adjusts an output value of the degree of accuracy using a predetermined parameter with a tendency to decrease the output value of the degree of accuracy corresponding to a correct-answer class and to increase the output value of the degree of accuracy corresponding to a class other than the correct-answer class, wherein the processor trains the machine learning model on the basis of the adjusted output value, and wherein the processor sets the same predetermined parameter for two or more classes between which a difference in a performance index of the degree of accuracy output from the machine learning model is determined to be equal to or less than a threshold value out of a plurality of classes.

7. A learning method of training a machine learning model on the basis of training data including correspondence between pixels of one or more images and correct-answer classes, the machine learning model being a convolutional neural network, receiving an input of an image including a plurality of pixels and outputting a degree of accuracy with which each pixel corresponds to a class indicating a type of an object, the learning method being performed by a computer, the learning method comprising:

adjusting an output value of the degree of accuracy using a predetermined parameter with a tendency to decrease the output value of the degree of accuracy corresponding to a correct-answer class and to increase the output value of the degree of accuracy corresponding to a class other than the correct-answer class; and training the machine learning model on the basis of the adjusted output value, wherein the computer sets the same predetermined parameter for two or more classes between which a difference in the number of pieces of training data used as the correct-answer class for learning is determined to be equal to or less than a threshold value out of a plurality of classes.

8. A non-transitory computer-readable storage medium storing a program, the program causing a computer to train a machine learning model on the basis of training data including correspondence between pixels of one or more images and correct-answer classes, the machine learning model being a convolutional neural network, receiving an input of an image including a plurality of pixels and outputting a degree of accuracy with which each pixel corresponds to a class indicating a type of an object, the program causing the computer to perform:

adjusting an output value of the degree of accuracy using a predetermined parameter with a tendency to decrease the output value of the degree of accuracy corresponding to a correct-answer class and to increase the output value of the degree of accuracy corresponding to a class other than the correct-answer class; and training the machine learning model on the basis of the adjusted output value, wherein the computer sets the same predetermined parameter for two or more classes between which a difference in the number of pieces of training data used as the correct-answer class for learning is determined to be equal to or less than a threshold value out of a plurality of classes.

* * * * *